United States Patent
Nicklin et al.

(10) Patent No.: US 7,718,148 B2
(45) Date of Patent: May 18, 2010

(54) PRESSURE LEACHING SYSTEM AND METHOD

(75) Inventors: Donald James Nicklin, Burnie (AU); Peter James Tait, Burnie (AU)

(73) Assignee: Exergen Pty Ltd, Tasmania (AU)

( * ) Notice: Subject to any disclaimer, the term of this patent is extended or adjusted under 35 U.S.C. 154(b) by 200 days.

(21) Appl. No.: 11/662,257

(22) PCT Filed: Sep. 8, 2005

(86) PCT No.: PCT/AU2005/001362
§ 371 (c)(1),
(2), (4) Date: May 21, 2007

(87) PCT Pub. No.: WO2006/026819
PCT Pub. Date: Mar. 16, 2006

(65) Prior Publication Data
US 2008/0274027 A1    Nov. 6, 2008

(30) Foreign Application Priority Data
Sep. 10, 2004  (AU) ............................. 2004905239

(51) Int. Cl.
*B01J 10/00* (2006.01)
(52) U.S. Cl. .................................. 423/150.1; 422/129
(58) Field of Classification Search ................ 422/129
See application file for complete search history.

(56) References Cited

U.S. PATENT DOCUMENTS

| 5,709,731 A | 1/1998 | Armstrong |
| 2004/0144019 A1 | 7/2004 | Nicklin et al. |

FOREIGN PATENT DOCUMENTS

| CA | 2130774 A1 | 3/1995 |
| WO | WO-02/098553 A1 | 12/2002 |

*Primary Examiner*—Melvin C Mayes
*Assistant Examiner*—Melissa Stalder
(74) *Attorney, Agent, or Firm*—Birch, Stewart, Kolasch & Birch, LLP.

(57) ABSTRACT

A pressure leaching system for use in a leaching operation including: at least one reaction zone for receiving a slurry of material to be leached from a slurry source, the reaction zone being disposed relative to the slurry source such that slurry is resident in the reaction zone under gravity thereby providing at least part of the pressurisation required for the leaching operation.

10 Claims, 1 Drawing Sheet

PRESSURE LEACHING SYSTEM AND METHOD

Figure 1:
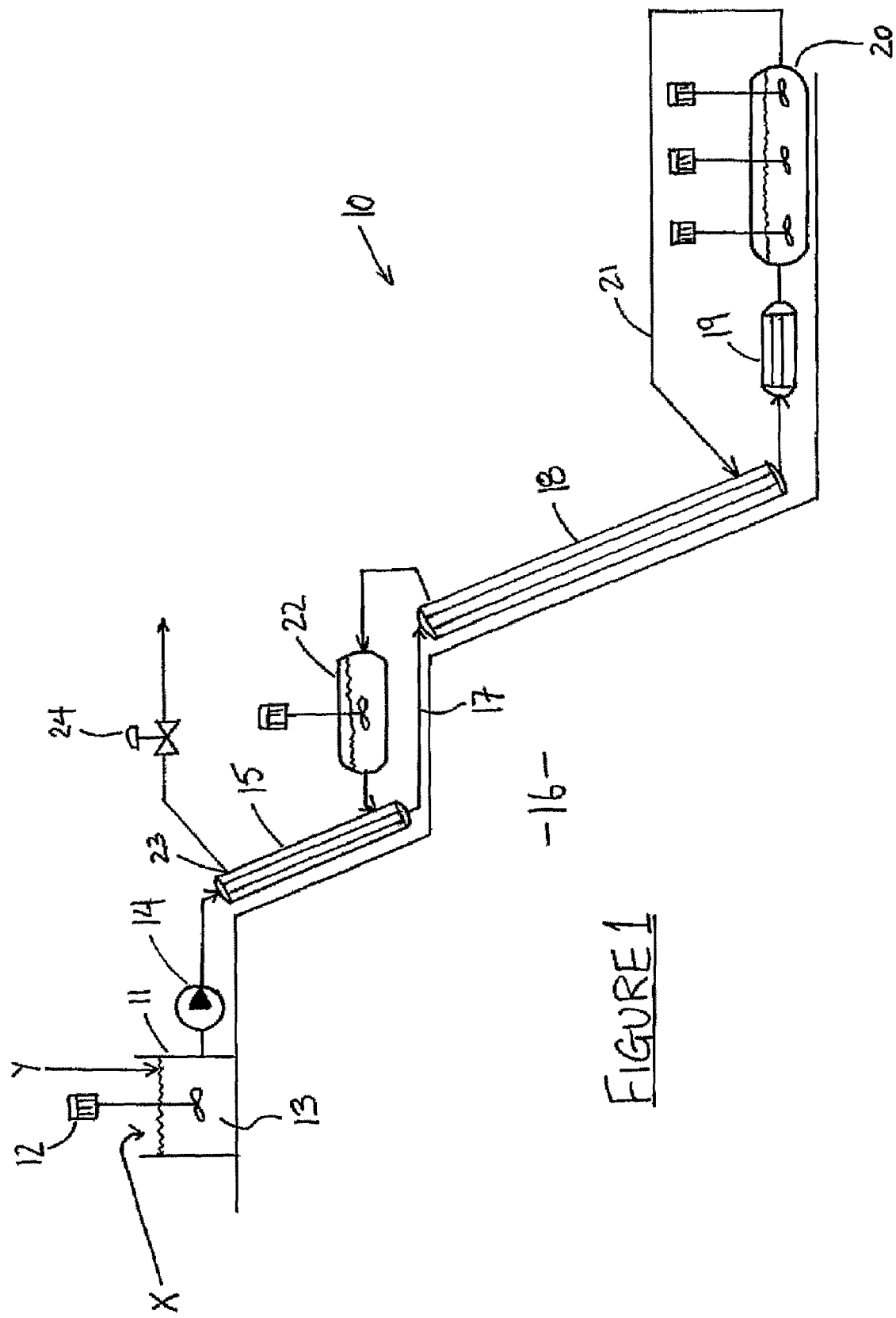

The present invention relates to a pressure leaching system and method for use in leaching operations, for example of nickel and other refractory ores. More particularly, the invention relates to pressure leaching systems and methods that employ gravity to provide at least part of the pressurisation required for the leaching operation.

For convenience, the following description will be generally directed to the leaching of nickel, but the systems and methods described may be suitably employed for leaching of other materials as would be appreciated by those of skill in the art.

Nickel is increasingly being recovered from laterite ore by pressure acid leaching. This operation has typically been conducted in autoclave vessels. The feed ore is pumped into the vessels as a slurry with sulfuric acid. It is desirable to digest the slurry at temperatures around 280° C. and under pressure conditions sufficient to prevent boiling of the fluid.

Significant problems are encountered in the areas of pressurisation of the slurry (normally involving positive displacement pumps), heat recovery to transfer heat from the treated slurry to the feed slurry and in the pressure let-down arrangements to release the treated slurry to atmospheric pressure.

The autoclave vessels are constructed of corrosion resistant materials to resist the sulfuric acid conditions. Earlier versions were made using acid resistant tiles inside a mild steel pressure vessel. Later autoclaves (especially in Australia) have used titanium lined steel plate as the construction material. The autoclaves are large vessels and are normally agitated by multiple agitators to keep the slurry in suspension. The internals of the vessels are arranged to achieve some degree of plug flow, but obviously there is still a significant spread in residence time.

It is known to add various agents to the autoclaves during operations—eg oxygen or sulphur to alter the Eh of solution. The influence of temperature is also known. Higher temperatures can be beneficial in speeding the kinetics of leaching of the ore, but it is also known that too high a temperature (eg over 300° C.) can lead to a loss in the efficiency of acid use as sulfuric acid begins to behave as a mono-protic acid at high temperatures.

The present invention advantageously provides an alternative arrangement for the pressure leaching of nickel and other materials, such as other refractory ores including gold and copper. The method advantageously alleviates or removes problems associated with pressurisation of the slurry to be leached, heat recovery and pressure letdown. Furthermore, the invention advantageously provides systems and methods that may operate under the influence of centrifugal pumps, rather than positive displacement pumps as commonly used to date. Also, according to the invention ore size may advantageously be tailored around a desirable size to be leached and is not influenced by pump selection.

According to one aspect of the present invention there is provided a pressure leaching system for use in a leaching operation including:
  at least one reaction zone for receiving a slurry of material to be leached from a slurry source, the reaction zone being disposed relative to the slurry source such that slurry is resident in the reaction zone under gravity thereby providing at least part of the pressurisation required for the leaching operation.

As previously noted, and as described in the immediately preceding paragraph, the system according to the invention provides at least part of the pressurisation required for the leaching operation through gravity acting on the slurry being leached. Preferably, the system is such that a substantial portion of the pressurisation required for the leaching operation is provided by gravity. For example, in a preferred embodiment the reaction zone is exposed such that at least 30%, more preferably at least 40%, even more preferably at least 60%, and in some embodiments greater than 80%, of the pressurisation required for the leaching operation is provided by gravity.

The reaction zone may include any suitable arrangement provided that gravity acts on the slurry to be leached to provide pressurisation during the leaching operation. This may include any suitable configuration of piping or the like. In one embodiment, the reaction zone includes a length of piping that is downwardly extending relative to the slurry source. It will be appreciated that the piping may include some form of heating to bring the slurry to be leached to a suitable temperature. In an alternative and preferred embodiment, the reaction zone includes a heat recovery exchanger that is downwardly extending relative to the slurry source.

According to this embodiment, the reaction zone preferably includes a reaction vessel disposed down stream of the heat recovery exchanger to provide additional residence time for the leaching operation. In that case, it is preferred that reticulation is provided for reticulating slurry emitted from the reaction vessel back to the heat recovery exchanger to provide sensible heat to the slurry passing through the heat recovery exchanger from the slurry source.

If desired, or required, a heater may be provided upstream of the reaction vessel to heat slurry emitted from the heat recovery exchanger before it is introduced to the reaction vessel.

It will be appreciated that such an arrangement, and arrangements as discussed below, may provide for suitable heat transfer functionality with a large proportion of sensible heat being recovered from the slurry being cooled and transferred to the slurry being heated. Additional heating or cooling may be provided as required to make up the overall heat balance.

According to a particular embodiment of the invention, the reaction zone includes:
  a first heat recovery exchanger that is downwardly extending relative to the slurry source;
  a second heat recovery exchanger in communication with, and downwardly extending from, the first heat recovery exchanger;
  a first reaction vessel disposed downstream of the second heat recovery exchanger to provide additional residence time for the leaching operation;
  reticulation for reticulating slurry emitted from the first reaction vessel back to the second heat recovery exchanger to provide sensible heat to the slurry passing though the second heat recovery exchanger;
  a second reaction vessel for receiving reticulated slurry that has passed back through the second heat recovery exchanger;
  reticulation for reticulating slurry emitted from the second reaction vessel back to the first heat recovery exchanger to provide sensible heat to the slurry passing through the first heat recovery exchanger from the slurry source; and
  an outlet from the first heat exchanger.

According to this embodiment, it is preferred that a heater be provided upstream of the first reaction vessel to heat slurry emitted from the second heat recovery exchanger before it is introduced to the first reaction vessel.

The reaction zone may include an arrangement as described in the applicant's International Publication No.

WO02/098553 which is explicitly incorporated herein by reference in its entirety. This document discloses an arrangement for the treatment of materials where at least one vessel is located beneath a surface of the ground and is adapted to receive the materials to be treated. At least one of the vessels extends to a depth below the surface sufficient to generate pressure from a hydrostatic head in an inlet to or outlet from the vessel, the inlet including at least two tubes.

The reaction zone may include a number of reaction vessels, such as autoclave vessels or reaction chambers, having any suitable configuration. Preferably, these vessels are located beneath the surface of the ground. Furthermore, each vessel may include as its inlet an array of tubes, for example seven or more, twenty or more, between fifty and two hundred or more than two hundred tubes may form the inlet to each of the vessels. The inlet tubes will generally have a diameter in the range of from 25 to 100 mm, preferably around 50 mm.

If one or more of the vessels is located beneath the surface of the ground, it is preferred that the vessel or vessels extends at least 100 m below the surface of the ground, more preferably at least 300 m below the surface.

Further embodiments of the reaction zone of the system of the present invention may be appreciated from the disclosure of WO02/098553 which is, as previously noted, incorporated herein by reference.

It will be appreciated that the above systems advantageously reduce the power requirements of the feed pumps to inject the slurry into the reaction zone and advantageously reduce the energy release upon pressure reduction back to atmospheric pressure. Furthermore, as already noted, heat exchange that may be incorporated advantageously recovers a high proportion of the sensible heat in the system. Still further, the above embodiments may provide for leaching operations at a number of different temperatures, or over a wide temperature range. The reaction vessels described, having larger volumes for reaction, facilitate increased residence time where needed or desired along the heating/pressurising/reacting pathway.

Using the systems, it may be possible to arrange schemes whereby the advantages of subjecting the ore to high temperatures to aid the kinetics of leaching and to lower temperature regions to ensure the efficient use of the leaching acid are maximised. The plug flow characteristics of reactor systems consisting of significant portions being made up of pipe runs will also yield advantages in the residence time distribution.

According to another aspect of the invention there is provided a method for pressure leaching including:
  supplying a slurry of material to be leached from a slurry source to a reaction zone, the reaction zone being disposed relative to the slurry source such that slurry is resident in the reaction zone under gravity thereby providing at least part of the pressurisation required for the leaching operation.

As with the system described above, the reaction zone is preferably disposed such that at least 30%, more preferably at least 40%, even more preferably at least 60%, and in some cases greater than 80% of the pressurisation required for the leaching operation is provided by gravity.

According to a particular embodiment, the method includes:
  supplying the slurry of material to be leached to a heat recovery exchanger;
  passing the slurry through the heat recovery exchanger;
  feeding slurry emitted from the heat recovery exchanger to a reaction vessel;
  reacting the slurry in the reaction vessel;
  reticulating the slurry from the reaction vessel back to the heat recovery exchanger to provide sensible heat to the slurry passing through the heat recovery exchanger from the slurry source; and
  recovering leached slurry from the heat recovery exchanger.

According to this embodiment, the slurry emitted from the heat recovery exchanger may be heated or cooled before it is fed to the reaction vessel or whilst it is in the reaction vessel.

According to a more preferred embodiment of the invention, the method includes:
  supplying the slurry of material to a first heat recovery exchanger that is downwardly extending relative to the slurry source and passing the slurry through the first heat recovery exchanger;
  feeding slurry emitted from the first recovery heat exchanger to a second heat recovery exchanger in communication with, and downwardly extending from, the first heat recovery exchanger, and passing the slurry through the second heat recovery exchanger;
  feeding slurry emitted from the second heat recovery exchanger to a first reaction vessel disposed downstream of the second heat recovery exchanger and reacting the slurry in the first reaction vessel;
  reticulating slurry emitted from the first reaction vessel back to the second heat recovery exchanger to provide sensible heat to the slurry passing though the second heat recovery exchanger;
  feeding reticulated slurry that has passed back through the second heat recovery exchanger to a second reaction vessel and reacting the reticulated slurry in the second reaction vessel;
  reticulating slurry emitted from the second reaction vessel back to the first heat recovery exchanger to provide sensible heat to the slurry passing through the first heat recovery exchanger from the slurry source; and
  recovering leached slurry from the first heat recovery exchanger.

Once again, according to this embodiment, if needed the slurry emitted from the second heat recovery exchanger may be heated or cooled before it is introduced to, or whilst in, the first reaction vessel.

According to a further aspect of the invention there is provided use of gravity to provide at least part of the pressurisation required, preferably at least 30% of the pressurisation required, for a leaching operation on a slurry of material.

A particular embodiment of the invention will now be described with reference to FIG. 1 which illustrates a system as a flow diagram.

In FIG. 1, the system 10 includes a mixing vessel 11 into which a prepared ore X and leaching solution Y are introduced and mixed with a stirrer 12. This forms a slurry 13 to be leached. The slurry 13 is pumped via a centrifugal pump 14, potentially including a number of centrifugal pumps in series, for example three centrifugal pumps, to a first heat recovery exchanger 15. The slurry 13 is passed through the heat exchanger 15 under gravity due to the orientation of the heat exchanger 15 on the face of an open cut mine 16. Although the first heat exchanger 15 is depicted as downwardly sloping along the face of the open cut mine 16, it will be appreciated that the heat exchanger 15 may suitably be vertically orientated if desired.

Slurry emitted from heat exchanger 15 through conduit 17 is then passed to a second heat recovery exchanger 18 that is similarly downwardly orientated along a second face of the open cut mine 16. Once again, the second exchanger 18 may be vertically orientated if desired. It will be appreciated that the slurry introduced to the second heat exchanger 18 through conduit 17 is again acting under gravity as it passed through the second exchanger 18.

If desired, in order to increase the temperature of slurry emitted from heat exchanger 18, a heater 19 may be provided. This advantageously heats the slurry emitted from the second heat exchanger 18 prior to introduction to a reaction vessel 20.

The slurry is left in the reaction vessel 20, which may be for example an autoclave vessel or the like having agitation, for a desired residence time. In that regard, additional reagents may be injected into the reaction vessel 20, or cooling may be applied to the reaction vessel 20 as required. In that regard, reagents may also be injected along the reaction pathway wherever desirable.

Slurry that has been treated in the reaction vessel 20 for a suitable time is then reticulated back into the second heat exchanger 18 via a conduit 21. The reticulated slurry thereby facilities heat transfer to the slurry introduced to the second heat exchanger 18 via conduit 17.

The reticulated slurry having again passed through the second heat exchanger 18 is then fed to a second reaction vessel 22 where it is again left for a desired residence time under agitation. The combination of reactions in reaction vessels 20 and 22 advantageously provides for treatments at high temperature and pressure and also lower temperature thereby providing advantages to the system.

In a similar fashion to the slurry emitted from reaction vessel 20, the leached slurry in reaction vessel 22 is then fed into the first heat exchanger 15 so that sensible heat can be transferred to the slurry 13 being introduced to the first heat exchanger 15. The leached slurry is then fed from an outlet 23 of the first heat exchanger 15, through a back-pressure control valve 24, to further processing.

The described systems may be operated as desired. For example the systems may provide for batch operation or continuous operation. It will be appreciated that for continuous operation, residence times in the reaction vessels will be a function of vessel volumes and operating flow rates.

As previously noted, the systems and methods of the invention, although described with particular reference to nickel processing above, have much broader application, for example in the leaching of refractory ores such as gold and copper. The invention is considered to include within it ambit such leaching operations and others that would be appreciated by those of skill in the art.

Throughout the specification the aim has been to describe the preferred embodiments of the invention without limiting the invention to any one embodiment or specific collection of features. Those of skill in the art will therefore appreciate that, in light of the instant disclosure, various modifications and changes can be made in the particular embodiments exemplified without departing from the scope of the present invention. All such modifications and changes are intended to be included within the scope of the disclosure.

The invention claimed is:

1. A method for pressure leaching which comprises:
   supplying a slurry of material to be leached from a slurry source to a reaction zone, wherein the slurry of material comprises feed ore and leaching solution and the reaction zone being disposed relative to the slurry source such that slurry is resident in the reaction zone under gravity thereby providing at least 30% of the pressurisation required for the leaching operation, wherein in the reaction zone the slurry is passed downwardly through a first heat recovery exchanger and then through a second heat recovery exchanger to a first reaction vessel downstream of the second heat recovery exchanger;
   reacting the slurry in the first reaction vessel;
   reticulating the reacted slurry from the first reaction vessel back to the second heat recovery exchanger to provide sensible heat to the slurry passing downwardly through the second heat recovery exchanger from the first heat recovery exchanger;
   reticulating the reacted slurry emitted from the second heat recovery exchanger back to a second reaction vessel providing additional residence time for the leaching operation;
   reticulating the reacted slurry emitted from the second reaction vessel back to the first heat recovery exchanger to provide sensible heat to the slurry passing downwardly through the first heat recovery exchanger; and
   recovering leached slurry from the first heat recovery exchanger.

2. A method according to claim 1, including agitating the slurry in the first reaction vessel.

3. A method according to claim 1, including heating or cooling the slurry as it passes downwardly to the first reaction vessel between the second heat recovery exchanger and the first reaction vessel or in the first reaction vessel.

4. A method according to claim 1, including agitating the reticulated slurry in the second reaction vessel.

5. A method according to claim 1, wherein the second reaction vessel is separate from and not in heat exchange relation with slurry passing downwardly through and between the first heat recovery exchanger and the second heat recovery exchanger.

6. A pressure leaching system for use in a leaching operation comprising:
   at least one reaction zone for receiving a slurry of material to be leached from a slurry source, wherein the slurry of material comprises feed ore and leaching solution the reaction zone being disposed relative to the slurry source such that slurry is resident in the reaction zone under gravity thereby providing at least 30% of the pressurisation required for the leaching operation, wherein the reaction zone comprises:
   a length of piping that is downwardly extending relative to the slurry source and comprises in series a first heat recovery exchanger and a second heat recovery exchanger;
   a first reaction vessel connected to the downwardly extending length of piping downstream of the second heat recovery exchanger to provide additional residence time for the leaching operation;
   reticulation for reticulating slurry emitted from the first reaction vessel back to the second and then to the first heat recovery exchanger to provide sensible heat to the slurry passing downwardly through the length of piping from the slurry source; and
   a second reaction vessel connected between the second heat recovery exchanger and the first heat recovery changer for receiving reticulated slurry that has passed back through the second heat recovery exchanger to provide additional residence time for the leaching operation, the first heat recovery exchanger being arranged to receive slurry reticulated back from the second reaction vessel.

7. A pressure leaching operation according to claim 6, wherein the first reaction vessel has agitation for the slurry therein.

8. A pressure leaching system according to claim 6, wherein heating or cooling is provided for the slurry between the second heat recovery exchanger and the first reaction vessel or in the first reaction vessel.

9. A pressure leaching system according to claim 6, wherein the second reaction vessel has agitation for the reticulated slurry therein.

10. A pressure leaching system according to claim 6, wherein the second reaction vessel is separate from and not in heat exchange relation with the length of piping.

* * * * *